Jan. 11, 1966  G. H. ASHTON  3,228,584
BAGS

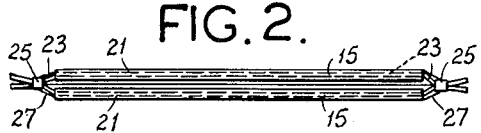
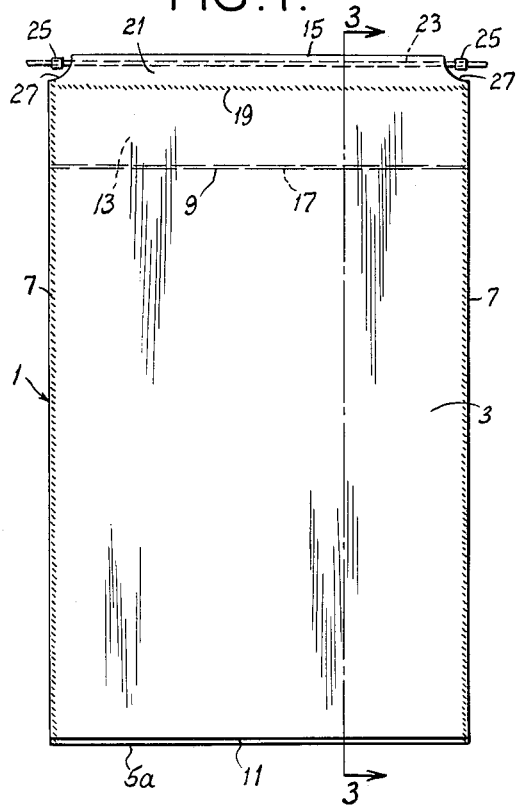
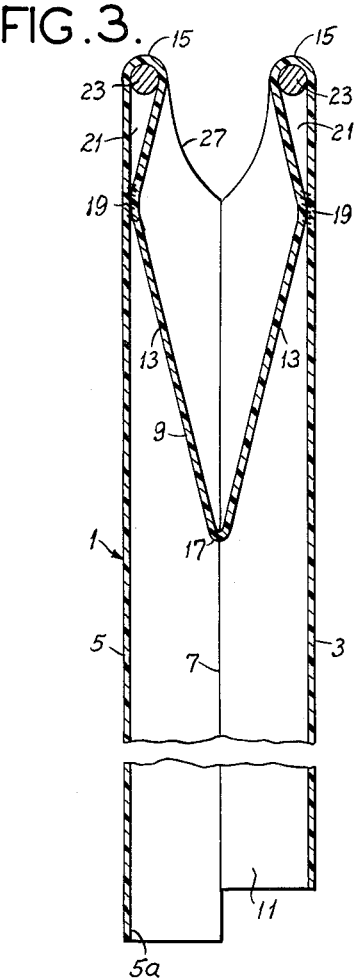

Filed Aug. 20, 1959  4 Sheets-Sheet 2

George H. Ashton,
Inventor.
Koenig and Pope,
Attorneys.

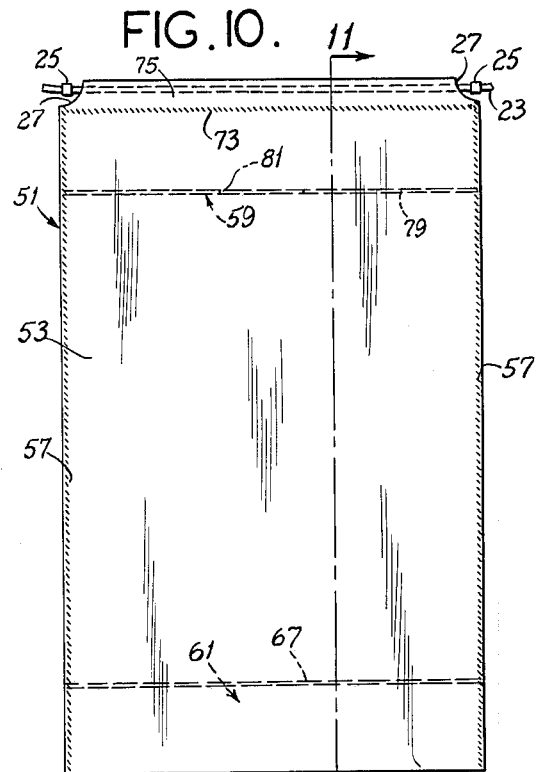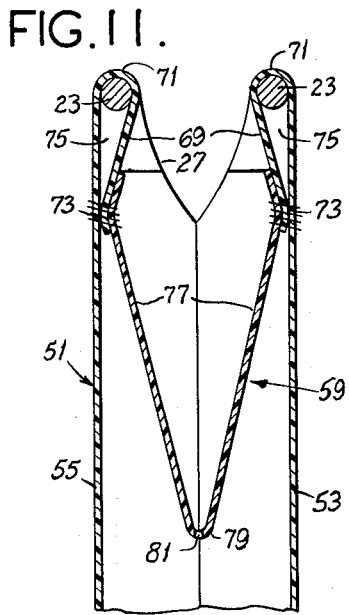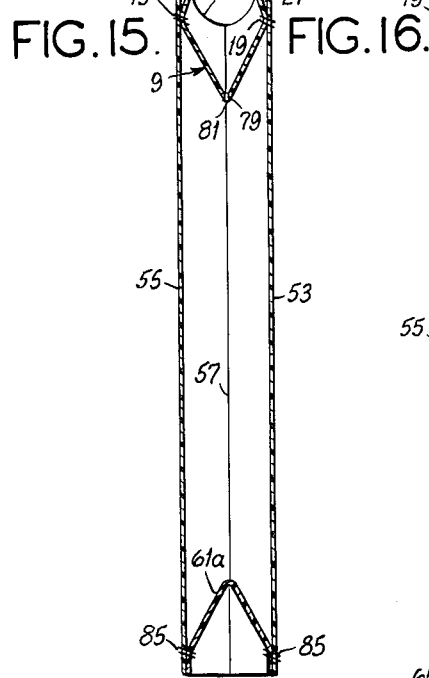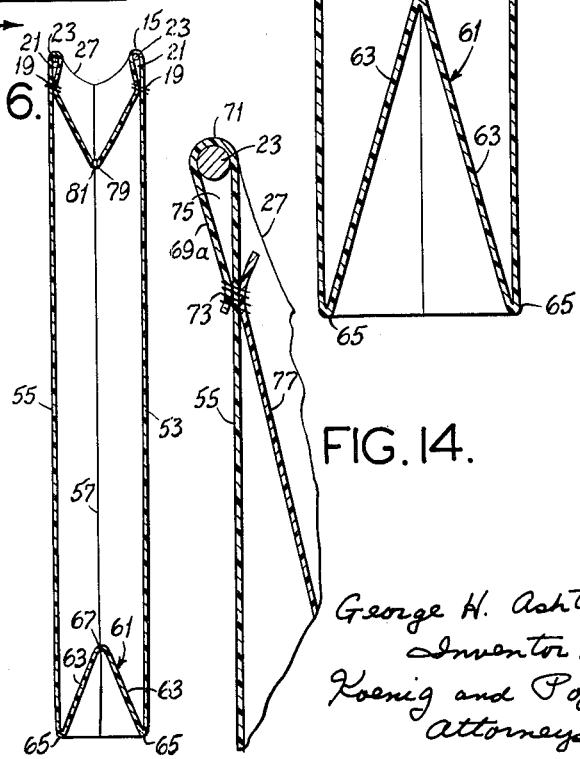

Jan. 11, 1966        G. H. ASHTON        3,228,584
BAGS
Filed Aug. 20, 1959        4 Sheets-Sheet 4
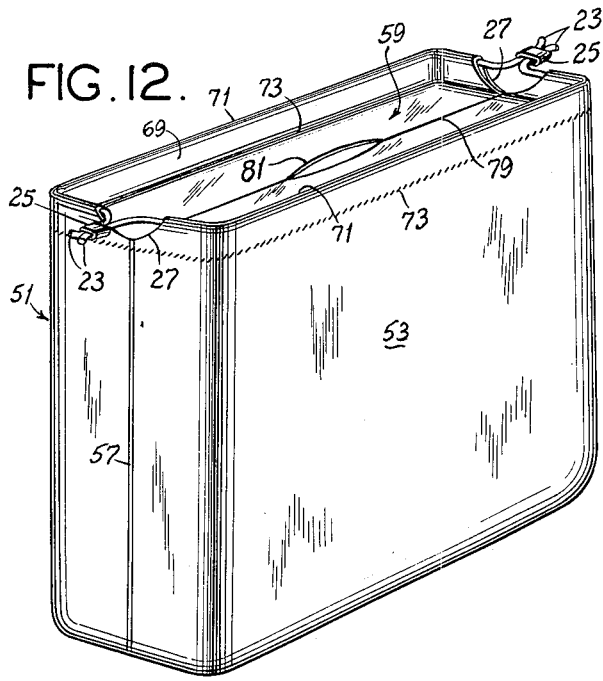
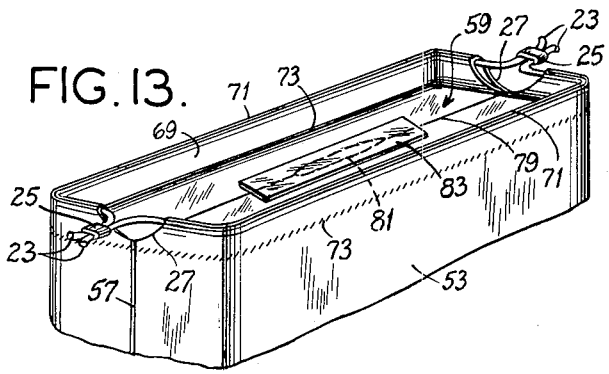
George H. Ashton,
Inventor.
Koenig and Pope,
Attorneys.

United States Patent Office 3,228,584
Patented Jan. 11, 1966

3,228,584
BAGS
George H. Ashton, Sappington, Mo., assignor to Bemis Company, Inc., a corporation of Missouri
Filed Aug. 20, 1959, Ser. No. 834,985
5 Claims. (Cl. 229—66)

The invention relates to bags, and more particularly to bags made of heat-sealable plastic material such as polyethylene, for loose material such as powdered or granular detergents, for example.

Among the several objects of the invention may be noted the provision of a bag, and more particularly a bag made of heat-sealable plastic such as polyethylene, adapted to maintain the contents of the bag tightly sealed against air, moisture and dust until the bag is opened at the top to obtain some of the contents, and having means whereby after the bag has been opened the top may be drawn closed, with the arrangement such that the bag may be reopened and reclosed as many times as needed until the contents have been completely used; the provision of a bag such as described in which the means for drawing the top of the bag closed comprises a draw cord (this term being intended to include a tape as well as an actual cord); and the provision of a bag such as described which, when filled, has a flat bottom so that it may stand upright and stack easily. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in elevation of a bag of this invention prior to filling thereof;

FIG. 2 is a plan view of FIG. 1;

FIG. 3 is an enlarged vertical section, with thicknesses exaggerated, taken on line 3—3 of FIG. 1, and with part of the bag broken away to reduce the height of the view;

FIG. 10 is a view in elevation of a second bag of this invention prior to filling thereof;

FIG. 11 is an enlarged vertical section, with thicknesses exaggerated, taken on line 11—11 of FIG. 10, partly broken away to reduce the height of the view;

FIG. 12 is a perspective view illustrating the FIG. 10 bag as it appears immediately after filling;

FIG. 13 is a fragment of FIG. 12 showing the application of a closure tape to a filling slit in the bag;

FIG. 14 is a fragmentary section illustrating a possible modification of the FIG. 10 bag; and, FIGS. 15 and 16 are views similar to FIG. 11 illustrating additional possible modifications of the FIG. 10 bag.

Corresponding reference characters indicate corresponding parts throughout the several views of the drawings.

Figure 5:
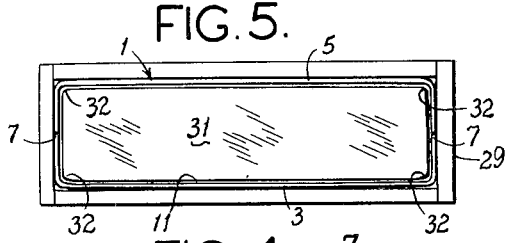
FIG. 5 is a plan view of FIG. 4.
Figure 4:
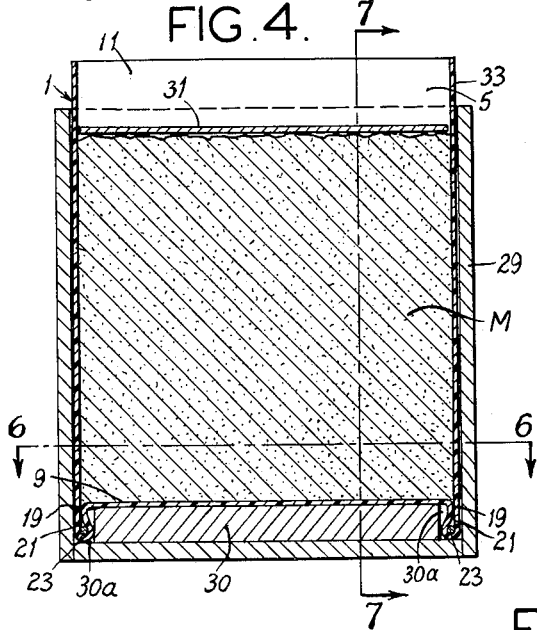
FIG. 4 is a vertical section illustrating the method of packing the FIG. 1 bag.
Figure 7:
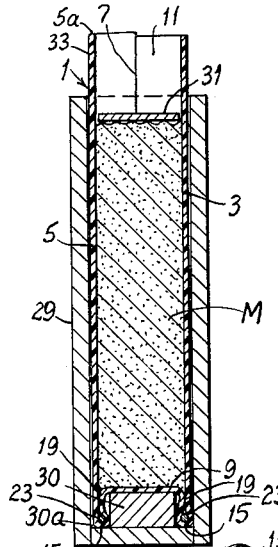
FIG. 7 is a vertical section taken on line 7—7 of FIG. 4.
Figure 6:
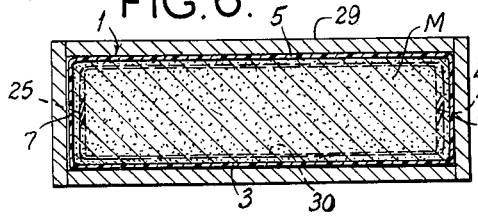
FIG. 6 is a horizontal section taken on line 6—6 of FIG. 4.
Figure 8:
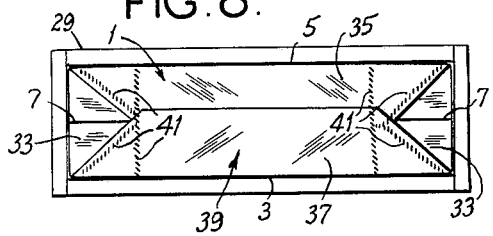
FIG. 8 is a view similar to FIG. 5 showing the completion of the packing operation.

Referring to FIGS. 1–3 of the drawings, there is indicated at 1 a first embodiment of the bag of this invention, made of heat-sealable flexible sheet plastic material such as polyethylene, having front and back walls 3 and 5 joined by heat-sealed seams 7 at the sides, having a top gusset 9, and being open at the bottom as indicated at 11. The bag consists of a single piece of the plastic material, the top gusset 9 being constituted by portions of the piece of material integral with the walls 3 and 5. Wall 5 may project somewhat beyond the bottom edge of wall 3 as indicated at 5a to facilitate opening up the bag bottom. The top gusset 9 extends from side-to-side of the bag between the walls 3 and 5. As a result of forming the heat-sealed bag side seams 7, the margins of the gusset 9 at each end thereof become heat-sealed together and are caught in the side seams 7. The top gusset therefore constitutes a top closure panel for the bag. It consists of a fold of the plastic material, each half thereof being designated 13. Each half is integrally joined to the respective wall 3 or 5 at a fold line 15 which constitutes a top edge of the bag, and the two halves are integrally joined together along a central fold line 17 which is spaced downward from the top of the bag.

Each half 13 of the top gusset 9 is secured to the respective wall 3 or 5 along a heat-sealed seam 19 extending transversely across the bag from one side thereof to the other spaced down from the top edge 15 but above the central gusset fold line 17. This forms a hem 21 at the top of each wall 3 and 5. These hems contain draw cord means comprising lengths of textile cord 23 (one such length in each hem) extending through the hems and out of the hems at both ends, and having their ends which extend out of the hems secured together as by means of staples 25. As shown, the top corners of the bag are cut out as indicated at 27. These cutouts 27 are located above the hem seams 19, and accommodate the draw cord ends and staples.

The above-described bags may be manufactured from a continuous web of plastic material using apparatus such as shown, for example, in Ashton et al. United States Patent 2,897,729, issued August 4, 1959, with suitable revisions in the folding of the web to provide the top gusset, as will be readily understood.

As illustrated in FIGS. 4–7, the bag 1 is packed (as with a powdered or granulated material, such as a detergent) by inverting the bag and placing it in an open-top box 29 which is of rectangular form in horizontal cross section conforming to the shape which the bag tends to assume when filled. Thus, the width of the box (see FIG. 7) corresponds to the width of the gusset 9 as spread out flat, i.e., twice the width of each panel 13 of the gusset as measured from a seam 19 to the central fold line 17. The length of the box (see FIG. 4) corresponds to the width of the bag minus the width of the gusset. The height of the box, as shown, may be such that the box extends somewhat above the level to which the bag is to be filled. The bottom of the box is provided with a block 30 somewhat smaller than the internal cross section of the box, thereby providing a space 30a all around the block adapted to accommodate the hems 21 of a bag 1. The gusset 9 is spread out flat on top of this block. The powdered or granulated material M is packed into the bag through the open bottom 11 of the bag, and compacted as by tamping it or vibrating the box. This causes the bag to spread out to squared form in the box. A rectangular panel 31 of any suitable stiff material, such as corrugated boxboard or other cardboard, having a width corresponding to the width of the box and a length corresponding to the length of the box, is inserted in the bag through its open bottom and pressed down on top of compacted material M to lie horizontally flat thereon. Panel 31 preferably has rounded corners 32. Then portions 33 of the bag walls are folded over on top of the panel 31 to form bag bottom closure end flaps, a portion 35 is folded over to form a first bottom closure side flap, and a portion 37 is folded over to form a second bottom closure side flap, and these are heat-sealed together on lines as indicated at 41 to form a completely sealed bottom closure 39 for the bag. As a consequence of the heat-sealing, the bottom closure 39 becomes heat-sealed to the panel 31, and this prevents shifting of the panel. It will be understood that the bag may be sealed at the bottom without insertion of the corrugated boxboard or other cardboard.

Figure 9:
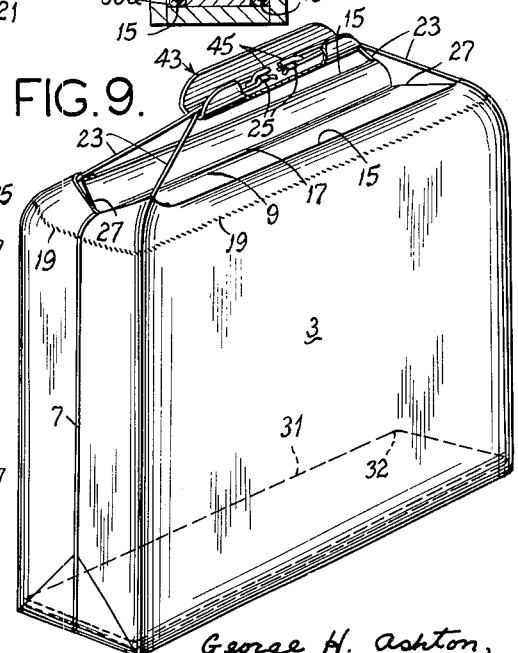
FIG. 9 is a perspective view showing how the filled bag may be carried by means of a carrying handle, the handle being partly broken away and shown in section.

The bag 1, filled and closed at the bottom as above described, is illustrated in FIG. 9 bottom down and top up. In view of the method of packing, it is tightly packed with a minimum of voids. Its bottom is rectangular and flat, and hence the bag may stand erect with stability and may be easily stacked. As shown, the bag is nicely squared up, and the contents thereof are tightly sealed against air, moisture and dust. The draw cord 23 may be utilized for carrying the bag. In the case of a heavy load (eight pounds of detergent, for example) a carrying handle such as indicated at 43 in FIG. 9 may be provided, this handle comprising a sheet metal channel having oppositely arranged tongues 45 struck in adjacent the center of its length over which the ends of the draw cord may be hooked. The top gusset 9 constitutes a top closure panel for the bag. When it is desired to remove part of the contents of the bag, a slit may be made in the top gusset. Thereafter, the draw cord 23 may be pulled to close the bag.

Referring to FIGS. 10–13 of the drawings, there is indicated at 51 a second embodiment of the bag of this invention, also made of heat-sealable flexible sheet plastic material such as polyethylene, having front and back walls 53 and 55 joined by heat-sealed seams 57 at the sides, having a top gusset 59 and a bottom gusset 61 (instead of being open at the bottom as in the FIG. 1 bag). The walls 53 and 55 and the bottom gusset 61 are constituted by a single piece of the plastic material, the bottom gusset being constituted by portions of the piece of material integral with the walls. The bottom gusset 61 extends from side-to-side of the bag between the walls. As a result of forming the heat-sealed bag side seams, the margins of the bottom gusset at each end thereof become heat-sealed together and are caught in the side seams 57. The bottom gusset consists of a fold of the plastic material, each half thereof being designated 63. Each half is integrally joined to the respective wall 53 or 55 at a fold line 65 which constitutes a bottom edge of the bag (in its flattened condition), and the two halves are integrally joined together along a central fold line 67 which is spaced above the bottom edge of the flattened bag.

As shown in FIG. 11, the top gusset 59 is constituted by a separate piece of the same plastic material as walls 53 and 55 and bottom gusset 61. Also, to form the hems at the top of the walls 53 and 55, marginal portions 69 of these walls are folded over on the inside of the walls on fold lines 71. The side margins of the top gusset 59 overlap these hem-forming marginal portions 69, and heat-sealed seams 73 are formed extending transversely across the bag securing each side margin of the top gusset and each hem-forming marginal portion 69 to the respective wall 53 or 55. The resultant hems are designated 75. The top gusset 59 extends from side-to-side of the bag between the walls 53 and 55 and the margins of the top gusset at each end thereof are heat-sealed together and caught in the bag side seams 57. The two halves of the top gusset 59 are each designated 77, these being joined to the respective wall 53 or 55 at a seam 73, and being integrally joined together along a central fold line 79 which is spaced downward from the top of the bag. A slit 81 is provided on this fold line 79. As in the FIG. 1 bag, the hems 75 contain cords 23 with the cord ends stapled together at 25, the top corners of the bag also having cutouts 27.

The bag 51 is filled through the slit 81, and then appears as shown in FIG. 12. After filling, slit 81, is closed as by means of a piece of pressure-sensitive adhesive tape 83 (see FIG. 13). The tape may be pulled off to open slit 81 for emptying part of the contents of the bag, and thereafter the draw cord 23 may be pulled to close the bag.

FIG. 14 shows a possible modification of the bag of FIGS. 10 and 11 wherein the hem-forming margins are turned to the outside instead of to the inside as in FIG. 11. In FIG. 14, the hem-forming margins are designated 69a to distinguish them from the margins 69 of FIG. 11. Otherwise, the FIG. 14 bag is the same as the bag illustrated in FIGS. 10 and 11.

FIG. 15 shows another possible modification of the FIG. 10 bag wherein the top gusset is constituted by portions integral with the bag walls as in the FIG. 1 bag, and is designated 9 the same as in the FIG. 1 bag, having seams 19 the same as in the FIG. 1 bag. The bottom gusset, designated 61a, is constituted by a separate piece of plastic material joined to the bottom margins of the bag walls 53 and 55 by heat-sealed seams 85. Otherwise the FIG. 15 bag is the same as the FIG. 10 bag.

FIG. 16 shows another possible modification which is similar to the FIG. 15 bag except that the bottom gusset is constituted by portions integral with the bag walls as in FIG. 11, being designated 61 the same as in FIG. 11.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A drawstring bag of flexible material having in its initially manufactured condition: a closed top end, an open bottom end, and opposed side edges, and including oppositely disposed front and back face panels merging together in three lines of fold at said top end, said lines of fold being spaced from and alternating in direction of fold with respect to each other to provide an interiorly disposed gusseted construction which is entirely below said top end and which includes two oppositely disposed interior panels respectively adjacent said front and back face panels, each of said interior panels, at their respective ends and adjacent the middle fold of said three lines of fold, being attached to the respective of said side edges of the bag, and each said interior panel being further attached, substantially along its length between said side edges and in parallel spaced relation with respect to the respective of said first and third lines of fold, to the said respectively adjacent of said front and back face panels to provide a tubular hem of each of said front and back face panels adjacent said top end, and drawstring means disposed within said tubular hems.

2. A drawstring bag of a single sheet of heat sealable, flexible material having in its initially manufactured condition: a closed top end, an open bottom end, and opposed side edges, and including oppositely disposed front and back face panels merging together in three lines of fold at said top end, said lines of fold being spaced from and alternating in direction with respect to each other to provide an interiorly disposed gusseted construction which is entirely below said top end and which includes two oppositely disposed interior panels respectively adjacent said front and back face panels, each said interior panel being attached, by a line of heat seal extending substantially along its length between said side edges and in parallel spaced relation with respect to the respective of said first and third lines of fold, to the said respectively adjacent of said front and back face panels to provide a tubular hem of each of said front and back face panels adjacent said top end, and drawstring means disposed within said tubular hems, said front and back face panels being heat sealed together at and thereby defining said side edges along their respective lengths extending from substantially said bottom end at least to the respective ends of said lines of heat seal attaching said interior panels, said interior panels being attached at their respective ends to said side edges of the bag.

3. A bag made of heat-sealable plastic material having front and back walls joined by heat-sealed seams at the sides of the bag, a top closure for the bag constituted by an interiorly disposed gusset which is disposed entirely below the top of the bag and which includes two oppositely disposed interior panels, one adjacent the front wall of the bag and the other adjacent the back wall of the bag, said gusset panels being joined together on a central gusset fold line which is disposed below the top of the bag, said gusset panels extending upward from said fold line, each of said gusset panels extending from side-to-side of the bag and having end edges located in said side seams of the bag and heat-sealed together and heat-sealed in said side seams, each of said gusset panels being heat-sealed at the upper edge thereof to the respective wall of the bag along a line extending transversely across the bag and spaced below the top of the bag, each of said front and back walls having a hem at the top thereof, and draw cord means contained in said hems, said gusset being adapted to have an opening made therein, and said draw cord means being adapted to draw the top of the bag closed after such opening has been provided in said gusset.

4. A bag as set forth in claim 3 wherein said gusset is constituted by integral portions of said front and back walls folded in from said walls at the top of the bag, and wherein said hems are formed by heat-sealed seams extending across the bag securing the respective panels of the gusset to the respective walls below the top of the bag and above the central fold of the gusset.

5. A bag as set forth in claim 3 wherein each hem is formed by an integral portion of the respective wall folded over on the respective wall and joined thereto at a heat-sealed seam extending across the bag, and wherein said gusset is constituted by a separate piece of heat-sealable plastic material having its margins heat-sealed to the respective walls at said heat-sealed hem seams.

References Cited by the Examiner
UNITED STATES PATENTS

| | | |
|---|---|---|
| 1,143,801 | 6/1915 | Bates. |
| 2,283,069 | 5/1942 | Knuetter _____ 229—53 |
| 2,292,295 | 8/1942 | Royal. |
| 2,585,214 | 2/1952 | Belmont. |
| 2,620,842 | 12/1952 | Hoeppner et al. |
| 2,635,788 | 4/1953 | Snyder et al. _____ 229—62 |
| 2,656,769 | 10/1953 | Hultkrans _____ 229—63 |
| 2,777,491 | 1/1957 | Ashton et al. |
| 2,849,171 | 8/1958 | O'Brien. |
| 2,863,365 | 12/1958 | Piazze _____ 229—63 |
| 2,935,241 | 5/1960 | Brady _____ 229—53 |

FOREIGN PATENTS

| | | |
|---|---|---|
| 1,183,880 | 2/1959 | France. |

THERON E. CONDON, *Primary Examiner.*

FRANKLIN T. GARRETT, EARLE J. DRUMMOND,
*Examiners.*